UNITED STATES PATENT OFFICE 2,081,003

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application December 31, 1934, Serial No. 760,028

5 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent used in our process consists of a bisulfite addition product of aldehydes produced by thermal decomposition of anhydroxylated, unsaturated, fatty acid or its ester. For instance, the thermal decomposition of castor oil or its acid, ricinoleic acid, yields heptaldehyde, sometimes referred to as "heptoic aldehyde". In our co-pending application for patent Serial No. 760,025, filed December 31, 1934, we have described a process for producing hydroxylated or oxy fatty bodies having an ethylene linkage and being analogous, in many chemical respects, to castor oil or ricinoleic acid. Briefly stated, the said process consists essentially of subjecting a relatively highly unsaturated fatty oil, preferably sardine oil or any other suitable marine oil having an iodine number of 120 to approximately 180 or 190, to a conventional oxidizing or blowing process with a drop in iodine number to approximately ⅔ or ½ its original value with a corresponding increase in acetyl value or oxygen absorption. Said oxidized oil is subjected to pyrolytic decomposition in the same manner as castor oil, so as to yield aldehydes similar to heptoic aldehyde and containing in part, as a rule, some proportion of heptoic aldehyde. These particular aldehydes so obtained are similar to heptoic aldehyde, presumably having either a few more divalent $CH_2$ groups, or possibly a few less, but being in the same molecular weight range and exhibiting essentially the same properties as heptoic aldehyde. The aldehyde so obtained, whether heptoic aldehyde derived from castor oil, or the mixture of aldehydes derived as stated from a drastically oxidized oil, will be referred to as aldehydes derived by thermal decomposition of an unsaturated oxy fatty body.

As to the decomposition of ricinoleic acid or castor oil to produce heptoic aldehyde, reference is made to the "Dictionary of Applied Chemistry", by Thorpe, volume 4, 1922, pages 630 and 631. The reaction there indicated is as follows:

$$C_{18}H_{34}O_3 = C_6H_{13}CHO + C_{11}H_{20}O_2$$

As previously stated, the thermal decomposition of oxidized relatively highly unsaturated oils gives a mixture of aldehydes containing at least a proportion of heptoic aldehyde. As to the formation of addition products of heptoic aldehyde with the bisulfites of alkalies, reference is made to "Watts Dictionary of Chemistry", 1919, Muir & Morley, volume 2, page 680.

The demulsifying agent contemplated by our process may be prepared by contacting an aldehyde of the kind described with a concentrated solution of a bisulfite of an alkali, such as sodium bisulfite, ammonium bisulfite, potassium bisulfite, etc. Another suitable procedure for producing said demulsifying agent is to dissolve the selected aldehyde, such as a heptoic aldehyde in alcohol, and add a basic material, such as ammonia, caustic soda, caustic potash, triethanolamine, etc. and pass into said solution sulfur dioxide gas and thus precipitate or produce the bisulfite addition product. Insofar as it is possible to produce organic bisulfites corresponding to organic acid sulfites, it is also possible to produce addition products in which a sodium atom of the ordinary sodium addition product is replaced by an aliphatic radical, such as an ethyl radical, a methyl radical, a butyl radical, a propyl radical, etc.

It is not necessary that the material or compound used as the treating agent or demulsifying agent of our process be employed alone. Instead, said material or compound may have added thereto any of the numerous solvents commonly employed with conventional demulsifying agents, such as various alcohols, water, glycerine, etc. Said demulsifying agent may be introduced into the emulsion or brought into contact with the emulsion in any of the various ways and in the amounts now employed to treat petroleum emulsions with a chemical demulsifying agent.

In practising our invention a demulsifying agent of the kind above described may be used alone or in admixture with one or more of the demulsifying agents commonly employed in the demulsification of crude oil emulsions, providing decomposition does not take place. The bisulfite addition products are generally decomposed by the presence of acid or alkali, and therefore, if admixed with other demulsifying agents, they should be of the neutral type, such as the salts of modified fatty acids, salts of petroleum sulfonic acids, salts of alkylated aromatic sulfonic acids, etc. Although all the bisulfite addition products now available appear to be water-soluble, it is reasonable to suppose that one could produce a bisulfite addition product by substituting a long chain aliphatic group for the sodium atom in the ordinary sodium addition product, so as to produce a water-insoluble, oil-soluble addition product. It is believed that such an addition product, if available, would be just as effective as the water-soluble type.

Having thus described our invention, what we claim and desire to secure by Letters Patent is:

1. A process for breaking a petroleum emulsion of the water-in-oil type, which consists in subjecting the emulsion to the action of a demulsifying agent comprising a non-cyclic bisulfite addition product of a non-carboxy aldehyde obtained by thermal decomposition of an oxy unsaturated fatty body.

2. A process for breaking a petroleum emulsion of the water-in-oil type, which consists in subjecting the emulsion to the action of a demulsifying agent comprising a non-cyclic bisulfite addition product of a non-carboxy aldehyde obtained by thermal decomposition of ricinoleic body.

3. A process for breaking a petroleum emulsion of the water-in-oil type, which consists in subjecting the emulsion to the action of a demulsifying agent comprising a heptoic aldehyde addition product characterized by the type formula:

$$C_6H_{13}.CH(OH).SO_3Na$$

4. A process for breaking a petroleum emulsion of the water-in-oil type, which consists in subjecting the emulsion to the action of a demulsifying agent comprising a heptoic aldehyde addition product characterized by the type formula:

$$C_6H_{13}.CH(OH).SO_3K$$

5. A process for breaking a petroleum emulsion of the water-in-oil type, which consists in subjecting the emulsion to the action of a demulsifying agent comprising a heptoic aldehyde addition product characterized by the type formula:

$$C_6H_{13}.CH(OH).SO_3NH_4$$

MELVIN DE GROOTE.
BERNHARD KEISER.